(12) United States Patent
Leonardi et al.

(10) Patent No.: US 12,348,174 B2
(45) Date of Patent: *Jul. 1, 2025

(54) BI-STABLE, SUB-COMMUTATED, DIRECT-DRIVE, SINUSOIDAL MOTOR CONTROLLER FOR PRECISION POSITION CONTROL

(71) Applicant: AeroVironment, Inc., Arlington, VA (US)

(72) Inventors: Michael Leonardi, Simi Valley, CA (US); William Nicoloff, Camarillo, CA (US)

(73) Assignee: AeroVironment, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,016

(22) Filed: Mar. 27, 2024

(65) Prior Publication Data
US 2024/0266976 A1    Aug. 8, 2024

Related U.S. Application Data

(63) Continuation of application No. 17/578,129, filed on Jan. 18, 2022, now Pat. No. 11,973,455, which is a continuation of application No. 14/179,418, filed on Feb. 12, 2014, now Pat. No. 11,264,925, which is a continuation of application No. PCT/US2012/050451, filed on Aug. 10, 2012.

(60) Provisional application No. 61/523,195, filed on Aug. 12, 2011.

(51) Int. Cl.
| H02P 1/24 | (2006.01) |
| B60L 15/20 | (2006.01) |
| H02P 6/10 | (2006.01) |

(52) U.S. Cl.
CPC ............... *H02P 6/10* (2013.01); *B60L 15/20* (2013.01); *B60L 2200/10* (2013.01); *B60L 2220/16* (2013.01); *B60L 2240/421* (2013.01); *B60L 2240/423* (2013.01); *B60L 2260/32* (2013.01); *Y02T 10/64* (2013.01); *Y02T 10/72* (2013.01)

(58) Field of Classification Search
CPC ........ H02P 6/10; B60L 15/20; B60L 2200/10; B60L 2220/16; B60L 2240/421; B60L 2240/423; B60L 2260/32
See application file for complete search history.

(56) References Cited

U.S. PATENT DOCUMENTS

| 4,541,575 A | 9/1985 | Dickerson |
| 4,704,541 A | 11/1987 | Leiber |
| 5,223,778 A | 6/1993 | Svarovsky et al. |

(Continued)

OTHER PUBLICATIONS

International Search Report for Serial No. PCT/US12/50451 mailed Jan. 22, 2013.

(Continued)

*Primary Examiner* — Muhammad S Islam
(74) *Attorney, Agent, or Firm* — Command IP LLP; Pejman Yedidsion; Eric Aagaard

(57) ABSTRACT

An electric motor controller system for modulating requested motor torque via oscillating the instantaneous torque, including a bi-stable torque controller; a proportional-integral (PI) velocity controller a proportional-integral-differential (PID) position controller; and sinusoidal zero-velocity table mapping.

19 Claims, 6 Drawing Sheets

(56) References Cited

U.S. PATENT DOCUMENTS

| | | | |
|---|---|---|---|
| 6,002,234 A | * | 12/1999 | Ohm ................ H02P 6/06 |
| | | | 318/438 |
| 6,121,744 A | | 9/2000 | Hoda et al. |
| 6,374,047 B1 | | 4/2002 | Beran et al. |
| 2004/0038775 A1 | | 2/2004 | Shimizu et al. |
| 2007/0279615 A1 | | 12/2007 | Degnan et al. |
| 2008/0309274 A1 | | 12/2008 | Thomson |
| 2009/0033166 A1 | | 2/2009 | Takeuchi et al. |
| 2009/0087029 A1 | | 4/2009 | Coleman et al. |
| 2009/0216394 A1 | | 8/2009 | Heppe et al. |
| 2009/0284644 A1 | | 11/2009 | McKaughan et al. |
| 2010/0019120 A1 | | 1/2010 | Burnham et al. |
| 2010/0176685 A1 | | 7/2010 | Berdut-Teruel |
| 2011/0001020 A1 | | 1/2011 | Forgac |
| 2011/0084635 A1 | | 4/2011 | Brown |
| 2012/0251092 A1 | | 10/2012 | Zwaan et al. |

OTHER PUBLICATIONS

Liu, Zhu, & Howe, "Direct Torque Control of Brushless DC Drives with Reduced Torque Ripple," Jan. 26, 2005 [Retrieved on Nov. 13, 2012] Retrieved from the Internet.

\* cited by examiner

BI-STABLE, SUB-COMMUTATED, DIRECT-DRIVE, SINUSOIDAL MOTOR CONTROLLER FOR PRECISION POSITION CONTROL

CROSS REFERENCE TO RELATED APPLICATIONS

This application is a continuation of U.S. Non-Provisional patent application Ser. No. 17/578,129, filed Jan. 18, 2022, which is a continuation of U.S. Non-Provisional patent application Ser. No. 14/179,418, filed Feb. 12, 2014, which issued as U.S. Pat. No. 11,264,925 on Mar. 1, 2022, which is a continuation of International Patent Application No. PCT/US12/50451, filed Aug. 10, 2012, which claims priority to and the benefit of U.S. Provisional Application No. 61/523,195, filed Aug. 12, 2011, all of which are hereby incorporated by reference herein for all purposes.

TECHNICAL FIELD OF ENDEAVOR

The field of the invention relates to the control of direct current (DC) motors, and more particularly to the control of asymmetric direct-drive brushless DC motors.

BACKGROUND

In order to achieve sub-degree pointing accuracy with brushless DC motor controllers, servo drives, stepper motors, and various other motor topologies are chosen for their ease of implementation. Servo controllers typically require gears to achieve their precision by commutating through several electrical commutation cycles. Micro-Stepping commutation methods used with stepper motors allow one to increase their precision beyond the standard capabilities of the system but are not extendable to direct drive brushless DC motors.

SUMMARY

Embodiments of the invention include an electric motor controller system for modulating requested motor torque via oscillating the instantaneous torque, the system comprising a torque drive oscillating circuit comprising a sinusoidal drive having at least three phases, where the instantaneous torque is based on a sinusoidal reference. Additional embodiments include an electric motor comprising a rotor having three or more multi-turn coils, each multi-turn coil disposed about an associated radial arm of the rotor, and a stator having circumferentially distributed magnetic elements. Additional embodiments include motor torque feedback and gain compensation, motor velocity feedback and gain compensation, and angular feedback and gain compensation. In additional embodiments, the sinusoidal reference may be a sinusoidal zero-velocity table mapping and may be configured to energize a brushless motor phase through a stator of the brushless motor, detect a static condition, and yield a symmetrical three-phase sinusoidal drive table for the brushless motor.

Additional embodiments include an electric motor controller for achieving sub-degree pointing accuracy of a brushless direct current (DC) motor comprising a bi-stable torque controller, a proportional-integral (PI) velocity controller, a proportional-integral-differential (PID) position controller, and sinusoidal zero-velocity table mapping. In additional embodiments, the brushless DC motor may be sub-commutated hundreds of times, i.e., greater than a hundred times, within one electrical commutation cycle. In additional embodiments, the bi-stable torque controller may be configured to oscillate about a request to yield a modulated torque value to average a total torque requested of the brushless DC motor. In additional embodiments, the bi-stable torque controller may be further configured to restrict a change in torque to a small fraction of torque change per second. In additional embodiments, the bi-stable torque controller may be further configured to adjust a delta torque more positive than negative to achieve a gradually modulated torque value when a forward position is requested. In additional embodiments, the bi-stable torque controller may be further configured to draw values from the sinusoidal zero-velocity table mapping. In additional embodiments, the proportional-integral (PI) velocity controller may be configured to output a result based on a velocity bias and a feedback of the brushless DC motor velocity. In additional embodiments, the proportional-integral-differential (PID) position controller may be configured to output a result based on a pointing routine and an angle measurement feedback. In additional embodiments the sinusoidal zero-velocity table mapping may be configured to advance or retard electrical degrees to yield a consistent torque curve over all positions within the brushless DC motor. In additional embodiments, the sinusoidal zero-velocity table mapping may be implemented in microcode.

Embodiments may also include an unmanned aerial vehicle (UAV) sensor apparatus, comprising a UAV, a direct-drive motor coupled to the UAV, and a sensor coupled to the direct-drive motor, the direct-drive motor configured to angularly drive the sensor. In such an embodiment, the direct-drive motor may be coupled to the UAV through a support.

BRIEF DESCRIPTION OF THE DRAWINGS

Embodiments are illustrated by way of example and not limitation in the figures of the accompanying drawing, and in which.

DETAILED DESCRIPTION

A technique, utilizing a direct drive brushless DC motor, is implemented by incorporating a bi-stable controller. In most position control methods, achieving sub-degree accuracy involves reducing torque ripple while minimizing torque changes for a given position. The exemplary method involves five components: a direct-drive brushless DC motor, a bi-stable torque controller, a proportional-integral (PI) velocity controller, a proportional-integral-differential (PID) position controller, and sinusoidal zero-velocity table mapping. The technique may be used in a variety of applications, include the control of a direct-drive motor driving a sensor, such as an imager, on an unmanned aerial vehicle (UAV)

Exemplary Brushless Direct Current Motor

Figure 1:
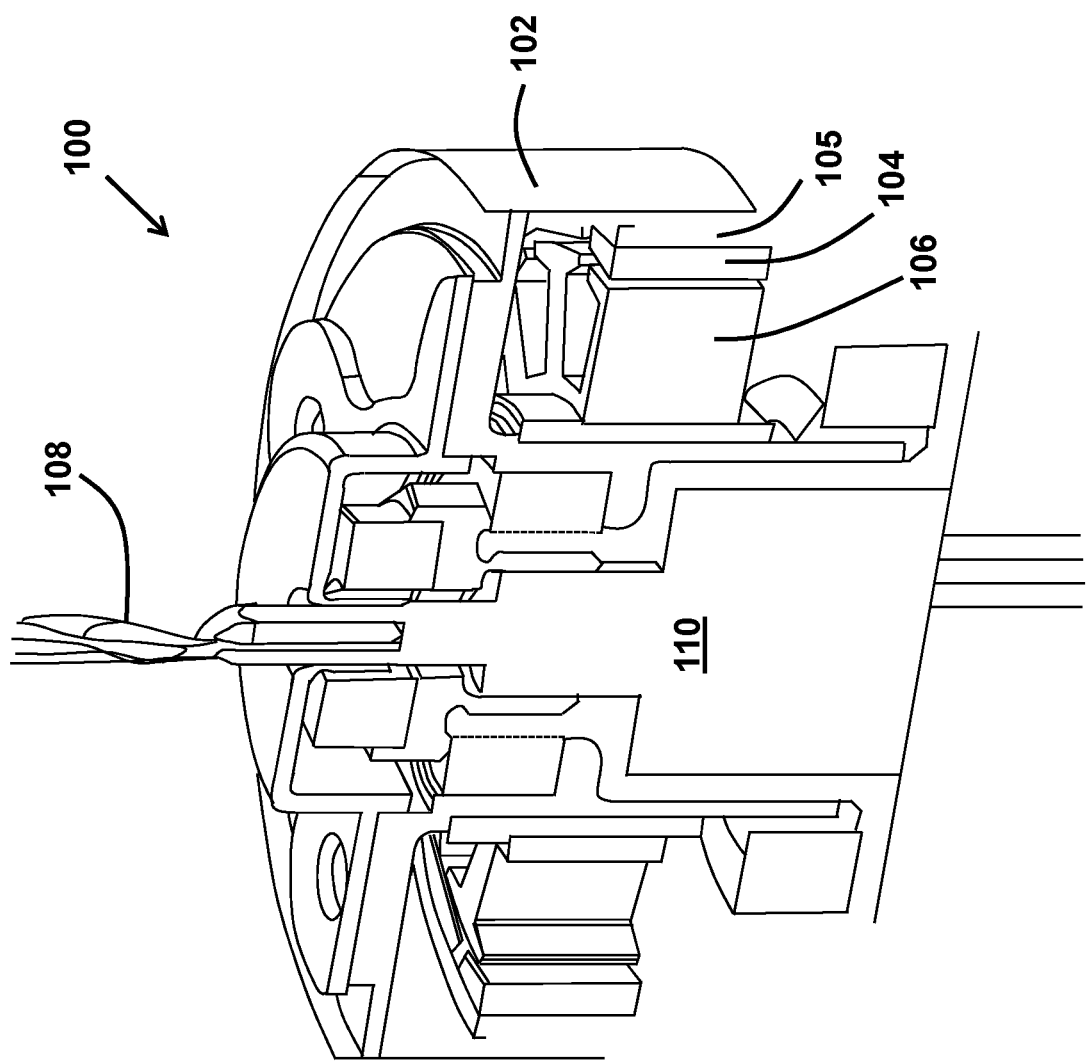
FIG. 1 depicts an exemplary portion of a brushless DC motor.

FIG. 1 illustrates, in a cut-away view, an exemplary brushless DC motor that includes an inrunner rotor electrically connected with a wye-configuration winding about improved armatures. The DC motor 100 may have a casing 102 formed of steel or other high-strength material to enclose and protect the motor 100. A stator 104 is positioned around the perimeter of a rotor 106, with the stator 104 coupled to an iron backing 105 to extend the magnetic field of the stator 104. The stator 104 may be formed of permanent magnets such as neodymium. The rotor 106 may be formed of a ferromagnetic material or a built up laminate. Power and signal cabling 108 extend through a donut hole 110 in the DC motor 100. An exemplary bi-stable controller may be embodied as a three-phase driver via embedded microcontroller hardware and circuitry comprising three half-bridges.

Figure 2:
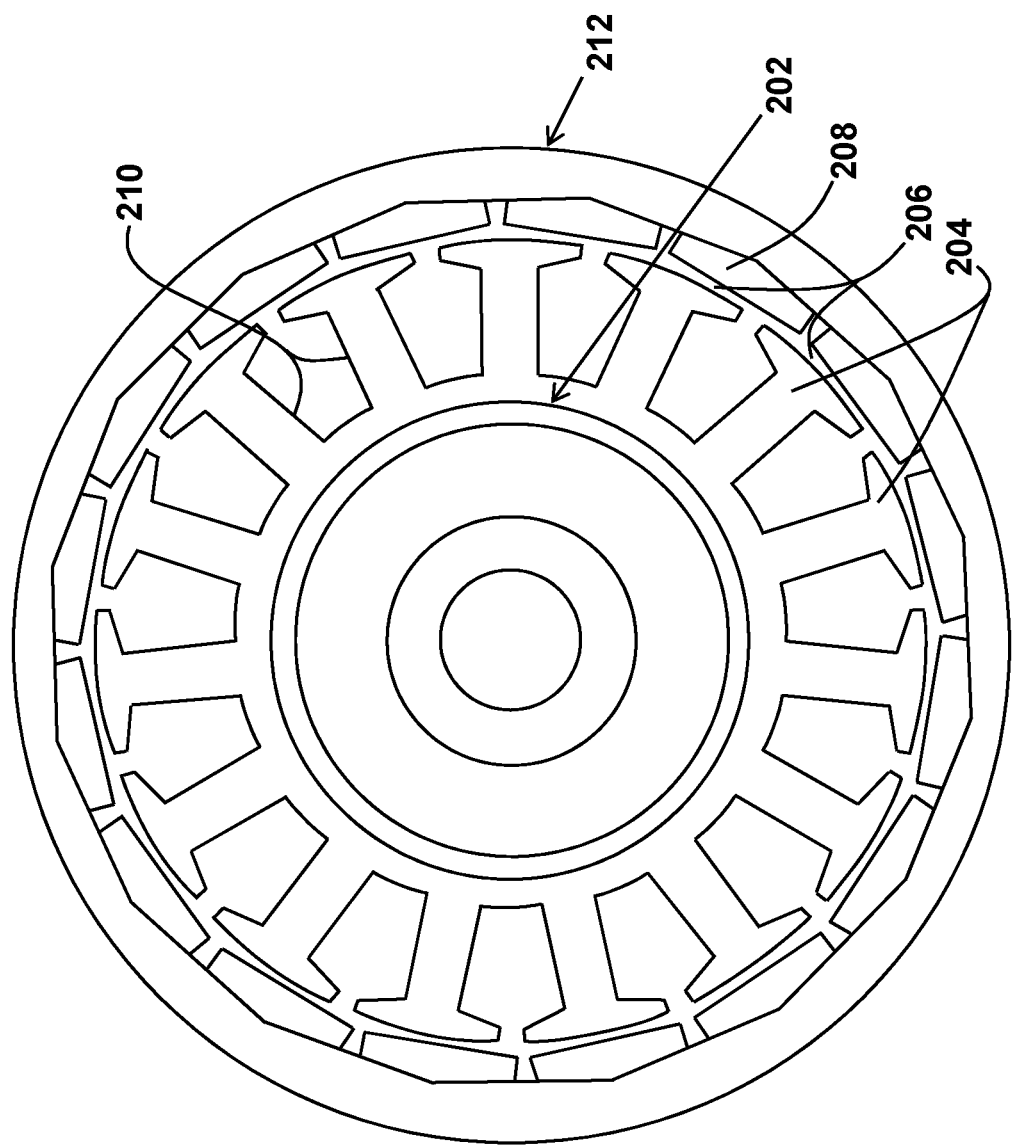
FIG. 2 is an exemplary top view of a rotor and a stator of a brushless DC motor.

FIG. 2 is an exemplary top view of a rotor 210 and a stator 212 of a brushless DC motor 200. In this exemplary embodiment, there are more stator poles 208, e.g., permanent magnets, than rotor armatures 204. The rotor 202 in this embodiment has fifteen armatures 204 and the stator 212 has sixteen permanent magnets 208. A minimum air gap 206 is maintained between each armature 204 and its respective magnets 208 as the armature 204 travels past a magnet 208 during operation. The minimum air gap 206 may be reduced to a distance approaching assembly tolerances of the motor to prohibit physical contact of the rotor and stator while increasing torque of the motor with closer placement of the stator and rotor. Opposing walls 210 of adjacent armatures 204 may each be planar and oriented perpendicular to an axis of rotation of the rotor 202. The rotor 202 may have three or more multi-turn coils. Each multi-turn coil may be disposed about an associated armature 204 of the rotor 202.

Figure 3:
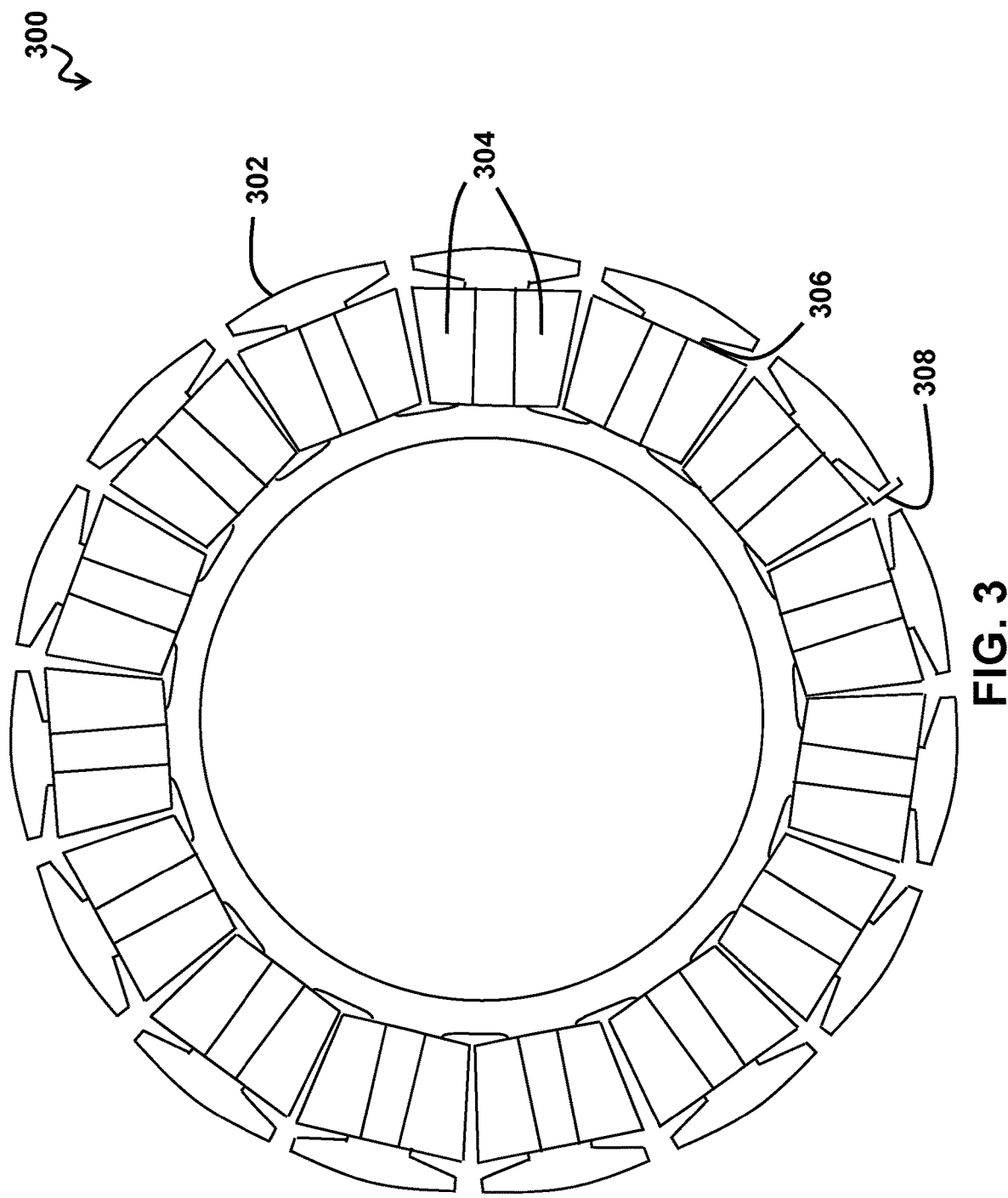
FIG. 3 is an exemplary top view of a rotor of a brushless DC motor.

FIG. 3 is an exemplary top view of a rotor of a brushless DC motor 300. Each armature 302 may have a coil 304 wrapped around its root section 306 to provide its excitation. Each coil 304 may be wrapped having progressively more turns as the root section 306 approaches the head portion 308 to enable a greater number of windings per armature 302 without impinging on an adjacent winding.

Block Diagram

Figure 4:
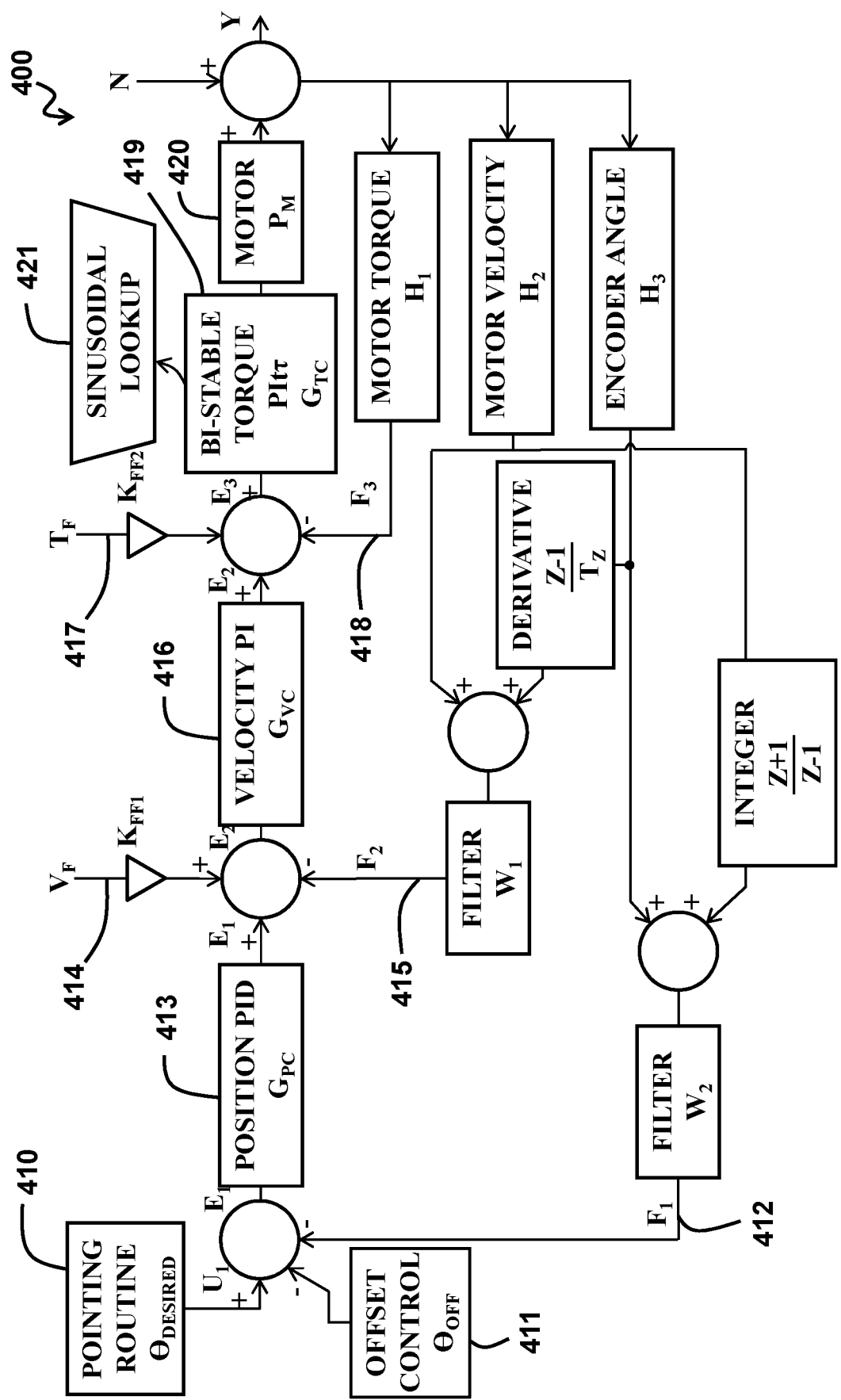
FIG. 4 depicts a Bi-Stable Motor Control Block.

FIG. 4 depicts a functional block diagram of an exemplary bi-stable motor controller 400. The block diagram represents the major parts of an exemplary control system, comprising inputs to the system, various position and velocity controllers, the bi-stable torque control, and feedback elements. A requested input angle $U_1$ ($\theta_{DESIRED}$) is summed with an offset ($\theta_{OFF}$) to yield a desired mechanical angle ($E_1$). This desired angle is then conditioned to yield a desired torque which is fed into the bi-stable torque control. The torque controller may oscillate about a request to yield a modulated torque value that may move or hold the motor into the desired position request. The various feedback elements are filtered and conditioned to reduce noise perturbations and generate accurate feedback information to yield a closed loop feedback control to continue the process. Inputs to the controller are depicted as a pointing routine input 410, an offset control input 411, and feedback from the angle measurement 412. The input signals are combined and then amplified or attenuated by a position PID gain 413. The output of the position PID gain 413 block is combined with a velocity bias 414 and feedback of the motor velocity 415, and then amplified or attenuated by a velocity PI gain 416. The output of the velocity PI gain 416 block is combined with a torque bias 417 and motor torque 418, amplified or attenuated by a torque gain 419, and the output of the torque gain 419 block is depicted as input to the motor 420. Values for the bi-stable torque gains 419 may be drawn from a sinusoidal lookup 421 that may be representative of a sinusoidal zero-velocity table mapping. The output of the motor 420 is depicted as driving the stabilized platform. The motor velocity feedback path is depicted as including a motor velocity proportional path, and a discrete derivative path from the output of the encoder angle path. The combination is depicted as filtered and fed into the controller ahead of the velocity PI gain 416. The position feedback path is depicted as including a proportional encoder angle path and a discrete integrator of the measured motor velocity. The combination is depicted as filtered and fed into the controller ahead of the position PID gain 413.

Direct Drive Brushless DC Motor

A direct drive brushless DC controller may reduce the mechanical complexity of the system, thus increasing the reliability and efficiency of the drive. The brushless DC motor 420 may be resistant to harsh collisions, e.g., the effects of infiltrating dirt and debris, as well as other environmental factors. Utilizing a direct drive motor 420 for sub-degree accuracy may require sub-commutating the motor 420 hundreds of times within one electrical commutation cycle.

Bi-Stable Torque Controller

By utilizing a current (I) sensor, output torque ($\tau$) can be estimated through the torque constant $K_t$ by $$K_t = 2BNlr = \frac{\tau}{I},$$

where N is the number of complete loops of the wire interacting with the permanent magnetic field, B is the magnetic field strength, l is the length of the magnet, and r is the radius of the motor armature. From this it can be equated to the velocity constant $K_v$ by $$K_v = \frac{1}{2BNlr} \text{ and } K_v = \frac{1}{K_t}, \text{ thus,}$$

$$\tau = \frac{I}{K_v}.$$

The bi-stable torque controller 419 may be implemented via two inputs. Total torque feedback input may be incorporated through a slow varying filter measured from the current sensor input. Torque input error may be allowed to change instantaneously depending on the direction of the velocity controller. Due to the nature of the controller, the stabilized platform, as the controlled plant, may oscillate around the desired stabilization point. The stabilization may be accomplished via commutating $\pm X°$ from the 0° commutation center at a high rate, e.g., at 5,000 times per second, and where X may be 83° but may vary from the standard 600 to 100°. The result of the commanded high rate oscillation is a bi-stable control, where the instantaneous torque oscillates to average the total torque requested of the motor.

The oscillatory torque may be stabilized by two exemplary functionalities. A first exemplary functionality comprises the restricting of the change of torque to a small fraction of torque change per second. The result of oscillating torque very rapidly in both negative and positive direction yields the following torque equation.

$$\tau_{Tot} = \tau \frac{t_1}{T} - \tau \frac{t_2}{T} \text{ where } T = t_1 + t_2$$

The first term $$\tau \frac{t_1}{T}$$

is from the positive torque contribution while $$-\tau \frac{t_2}{T}$$

is from the negative torque contribution.

In a static condition there would be an even torque distribution in both directions where total torque (τ total) may equal:

$$\tau \frac{t_1}{T} - \tau \frac{t_2}{T} \cong 0 \text{ where } T = t_1 + t_2$$

In the case where a forward position is requested, delta torque is adjusted more positive than negative, a $t_1$, value larger than the $t_2$ value may be produced, and this may result in a gradually modulated torque value. Additionally, any imbalance caused by torque ripple may cause small oscillations that may be rectified within the 5 kHz update rate. With a sinusoidal drive topology, all three phases may be used simultaneously to further reduce torque ripple. Torque ripple may be even further reduced by adding additional phases. For example, a 3-phase sinusoidal drive reduced torque ripple to 5% deviation, 4-phases, 5-phases or M-Phases (M>5) may be expected to reduce torque even further.

PI Velocity Controller

For a PI Velocity controller 416 sensor input is differentiated via an encoder at an input frequency of ~5 kHz, that may be infinite impulse response (IIR) filtered with 3 db attenuation with a cut-off frequency of about ~1.5 kHz, that outputs to the exemplary bi-stable Torque Controller 419.

PID Position Controller

A PID position controller 413 may be embodied as sampling directly from an encoder at an input frequency of @ 5 kHz 16-Tap finite impulse response (FIR) filter with 3 db attenuation with a cut-off frequency of about ~300 Hz.

Sinusoidal Zero-Velocity Mapping

Energizing a motor phase through the stator and waiting for static conditions results in the alignment of the stator poles to the rotor. The result of the alignment for all electrical phases yields a symmetrical three-phase sinusoidal drive table 421 for the motor. This table 421 is then advanced or retarded $\theta_{AR}$ electrical degrees to yield a consistent torque curve over all positions within the motor. A commutation table is a sinusoidal table which repeats the number of pole pairs of the motor within the 360° mechanical degrees. The table then takes the form:

$$A * \sin\left(\left(\frac{\theta_{mech}}{\left(\frac{\text{Poles}}{2}\right)}\right) \pm \theta_{AR} + \left(\left(\frac{2\pi}{3}\right) * P_x\right)\right),$$

where $P_x = \{0, 1, 2, \ldots M - 1\}$ for $M$ phases, $\theta_{mech}$ is the input mechanical angle, $\theta_{AR}$ is the advance or retard angle, and A is the desired amplitude.

The exemplary equation above, as a sinusoidal reference, may be implemented directly, i.e., implementing the equation in microcode for example rather than the look-up table.

Figure 5:
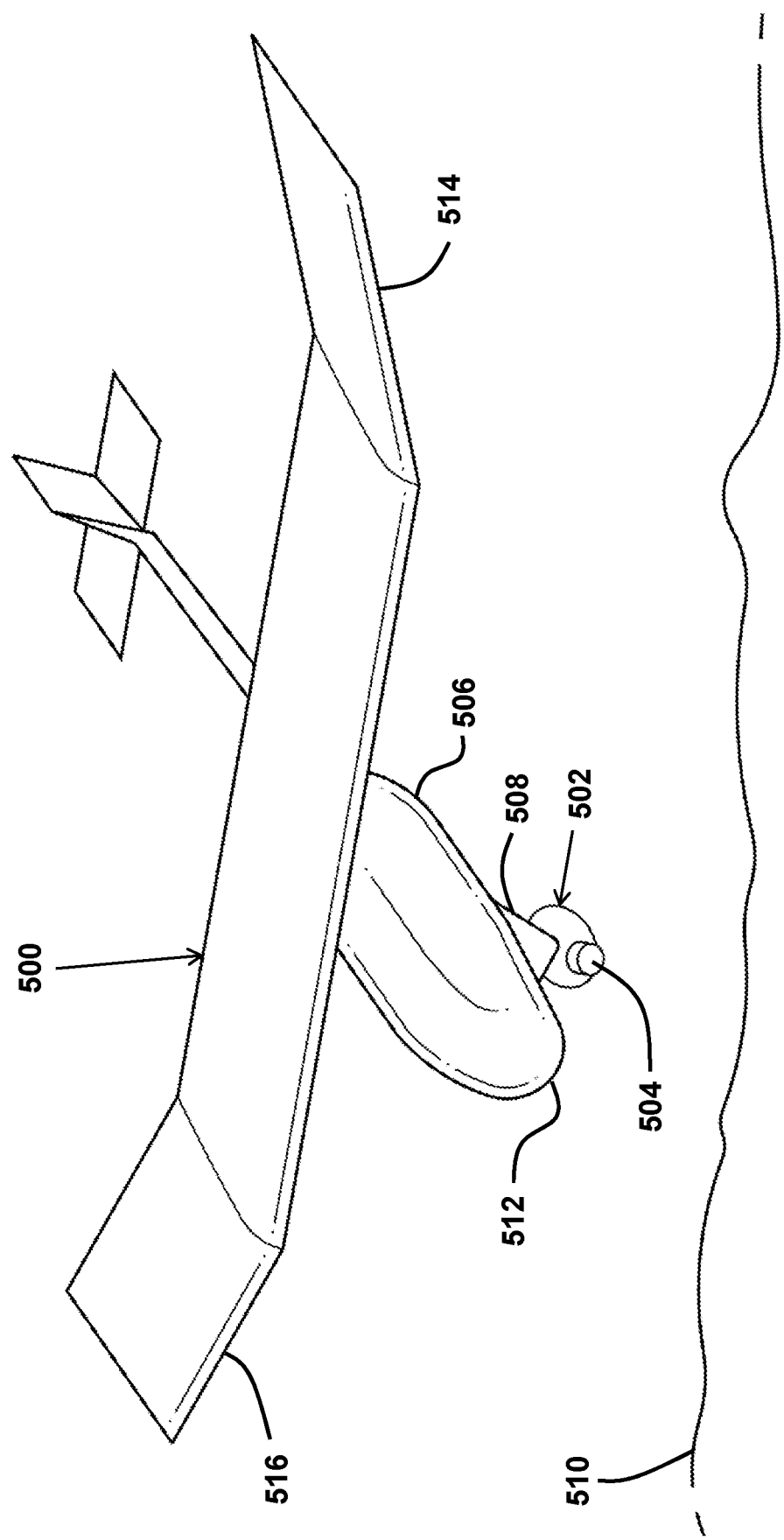
FIG. 5 is a perspective view of an unmanned aerial vehicle (UAV) with an exemplary sensor gimbal.

FIG. 5 is a perspective view of an unmanned aerial vehicle (UAV) 500 with an exemplary sensor gimbal 502. The sensor gimbal 502 may comprise a sensor 504, e.g., an imager, coupled to a direct drive motor (such as that illustrated in FIGS. 1-3), with the motor in a direct-drive configuration with the imager. The motor of the sensor gimbal 502 may be coupled to a fuselage 506 of the UAV 500, such as through a sensor gimbal support 508, to provide an unobstructed view of ground 510 for the imager. In alternative embodiments, the sensor gimbal 502 may be coupled to a front portion 512 of the fuselage 506 to provide an unobstructed view of both the ground 510 and an airspace in front of the UAV 500, or may be one of a plurality of sensor gimbals extending from a bottom surface of port or starboard wings (514, 516).

Figure 6:
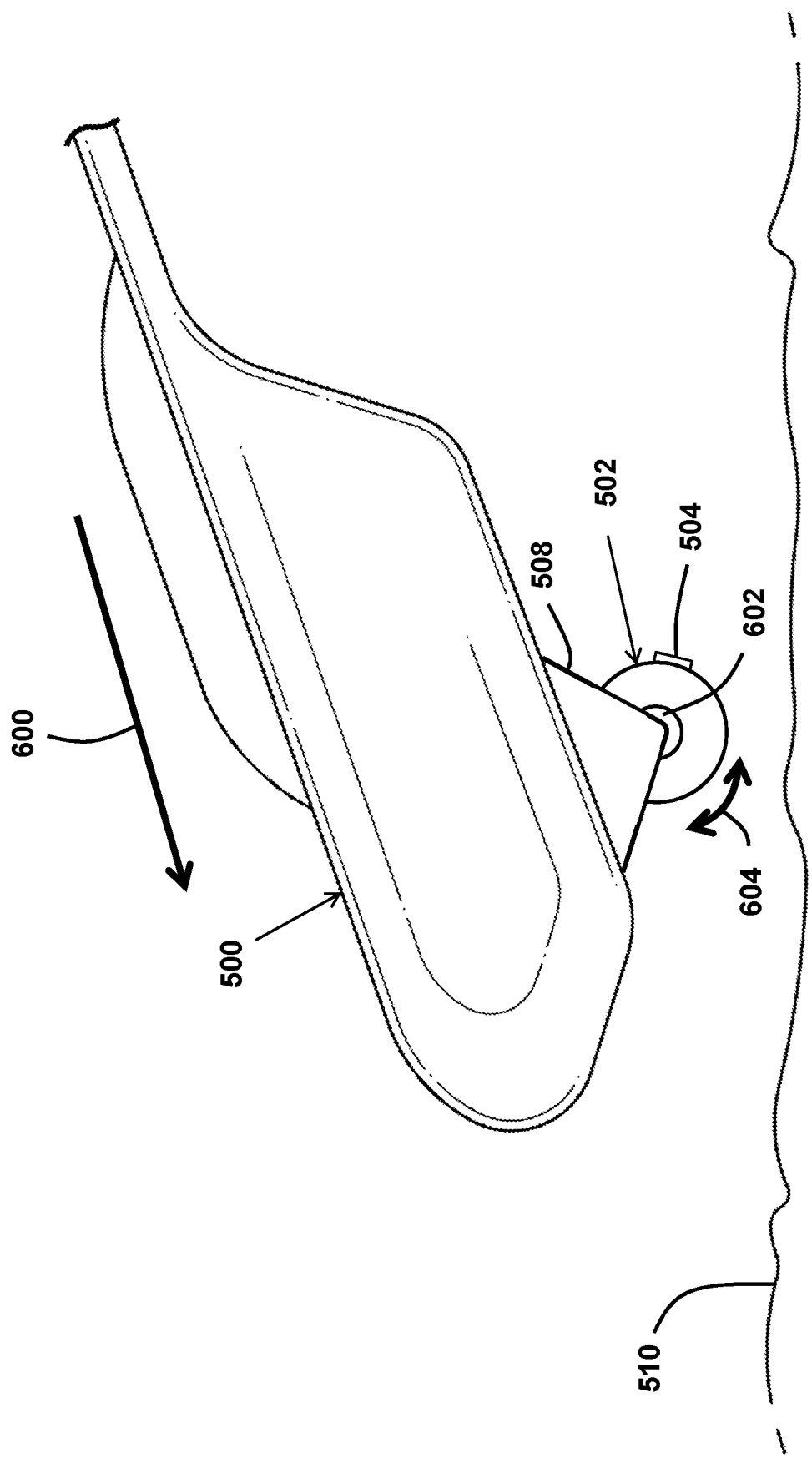
FIG. 6 is a side view of a UAV with an exemplary sensor gimbal approaching the ground.

FIG. 6 is a side view of the UAV 500 with the exemplary sensor gimbal 502 approaching the ground 510. In some embodiments, the UAV 500 is a glider or has an electric propulsion system (not shown), and so may have a forward motion 600 during approach and landing with the ground 510. The sensor gimbal 502 is illustrated having a motor 602 to rotate the sensor 504 in a direct-drive configuration on the sensor gimbal 502 to a stowed rear-facing angular position 604 for landing. In an alternative embodiment, the sensor 504 may be rotated to a forward-facing angular position or may remain in an arbitrary or other pre-determined position for landing. As used herein, "direct-drive configuration" means the sensor 504 may be rotatably driven by the motor 602 without the benefit of reduction gears. In one embodiment, the sensor 504 may be coupled to an exterior of the motor 602, with the motor 602 rotating around an inner stator fixed to the gimbal support 508. In an alternative embodiment, the sensor 504 may be coupled to a rotatable shaft of the motor via a linkage (not shown). In another alternative embodiment, the sensor 504 may be coupled to two or more motors to provide movement of the sensor 504 in two or more axes (not shown).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
    modulating a requested motor torque via oscillating a requested instantaneous torque;
    generating, by a bi-stable torque controller comprising a sinusoidal drive table having at least three phases, the requested instantaneous torque, wherein the requested instantaneous torque is based on the sinusoidal drive table; and communicating, via a brushless electric motor, with a torque drive oscillating circuit;
wherein the brushless electric motor comprises: a rotor having three or more multi-turn coils, each multi-turn coil disposed about an associated armature of the rotor; and a stator having circumferentially distributed magnetic elements.

2. The method of claim 1, further comprising:
drawing from a sinusoidal zero-velocity table mapping to energize a brushless motor phase through the stator of the brushless motor;
detecting a static condition; and
yielding a symmetrical three-phase sinusoidal drive table for the brushless motor.

3. A method comprising:
achieving sub-degree pointing accuracy of a brushless direct current (DC) motor;
communicating, via a proportional-integral (PI) velocity controller, with a proportional-integral-differential (PID) position controller;
communicating, via a bi-stable torque controller, with the PI velocity controller; and
reducing torque ripple via sinusoidal zero-velocity table mapping in communication with the bi-stable torque controller.

4. The method of claim 3, wherein the brushless DC motor is sub-commutated greater than one hundred times within one electrical commutation cycle.

5. The method of claim 3, further comprising:
outputting, via the proportional-integral (PI) velocity controller, a result based on a velocity bias and a feedback of the brushless DC motor velocity.

6. The method of claim 3, further comprising:
outputting, via the proportional-integral-differential (PID) position controller, a result based on a pointing routine and an angle measurement feedback.

7. The method of claim 3, further comprising:
adjusting, via the sinusoidal zero-velocity table mapping, $\theta_{AR}$ electrical degrees to yield a consistent torque curve over all positions within the brushless DC motor.

8. The method of claim 4, further comprising:
oscillating, by the bi-stable torque controller, about a request to yield a modulated torque value to average a total torque requested of the brushless DC motor.

9. The method of claim 5, further comprising:
outputting, via the proportional-integral (PI) velocity controller, the result to the bi-stable torque controller.

10. The method of claim 5, further comprising:
receiving, via the proportional-integral (PI) velocity controller, an input frequency of 5 kHz.

11. The method of claim 6, further comprising:
sampling, via the proportional-integral-differential (PID) position controller, directly from an encoder.

12. The method of claim 6, further comprising:
outputting, via the proportional-integral-differential (PID) position controller, the result to the proportional-integral (PI) velocity controller.

13. The method of claim 8, further comprising:
detecting, via a current sensor, a current through the brushless DC motor.

14. The method of claim 8, further comprising:
restricting, via the bi-stable torque controller, a change in torque to a small fraction of torque change per second.

15. The method of claim 8, further comprising:
adjusting, via the bi-stable torque controller, a delta torque more positive than negative to achieve a gradually modulated torque value when a forward position is requested.

16. The method of claim 8, further comprising:
drawing, via the bi-stable torque controller, values from the sinusoidal zero-velocity table mapping.

17. The method of claim 13, further comprising:
receiving, via the bi-stable torque controller, feedback input through a slow varying filter measured from an input of the current sensor.

18. The method of claim 16, further comprising:
using, via the sinusoidal zero-velocity table mapping, three phases simultaneously to reduce torque ripple.

19. The method of claim 16, further comprising:
using, via the sinusoidal zero-velocity table mapping, at least four phases simultaneously to reduce torque ripple.

* * * * *